United States Patent [19]

Silvey

[11] 4,398,437

[45] Aug. 16, 1983

[54] SAW CHAIN DEPTH GAUGE GRINDER

[76] Inventor: Elmer R. Silvey, 1231 Dutton Rd., Eagle Point, Oreg. 97524

[21] Appl. No.: 203,793

[22] Filed: Nov. 3, 1980

[51] Int. Cl.[3] .......................................... B23D 63/16
[52] U.S. Cl. ..................................... 76/25 A; 76/40; 76/78 R
[58] Field of Search ................ 76/25 A, 37, 40, 78 R

[56] References Cited

U.S. PATENT DOCUMENTS

| | | | |
|---|---|---|---|
| 2,811,874 | 11/1957 | Rethoret | 76/40 |
| 3,013,448 | 12/1961 | Deck | 76/25 A |
| 3,717,051 | 2/1973 | Silvey | 76/37 |
| 3,779,103 | 12/1973 | Silvey | 76/25 A |
| 3,929,049 | 12/1975 | Graversen | 83/834 |
| 4,104,793 | 8/1978 | Simington | 76/40 |
| 4,120,215 | 10/1978 | Kaye | 76/25 A |
| 4,235,131 | 11/1980 | Simington | 76/25 A |

*Primary Examiner*—Roscoe V. Parker
*Attorney, Agent, or Firm*—Klarquist, Sparkman, Campbell, Leigh, Whinston & Dellett

[57] ABSTRACT

An improved saw chain depth gauge grinder longitudinally positions the cutter links of saw chains with their depth gauges in a grinding position for grinding while preventing contact with other portions of the cutter link as they pass through the grinding position. A sprocket rotatably supports the saw chain beneath the grinding wheel. The grinding wheel is raised and lowered to a predetermined position to grind successive depth gauges to a uniform height as the saw chain circulates around the sprocket. One embodiment provides for a multiple-lobed camming member rotationally mounted on the sprocket for actuating a linkage to raise and lower the grinding wheel as the sprocket turns. Another embodiment provides for a pawl positioned adjacent the upper sprocket so as to provide a cutter link stop to position the depth gauge in the grinding position. The pawl also serves as a safety. As the sprocket is rotated to reposition the saw chain for grinding the depth gauge of the next link, the pawl is lifted by the next cutter link into the path of the grinding wheel so as to shield the cutter link.

7 Claims, 4 Drawing Figures

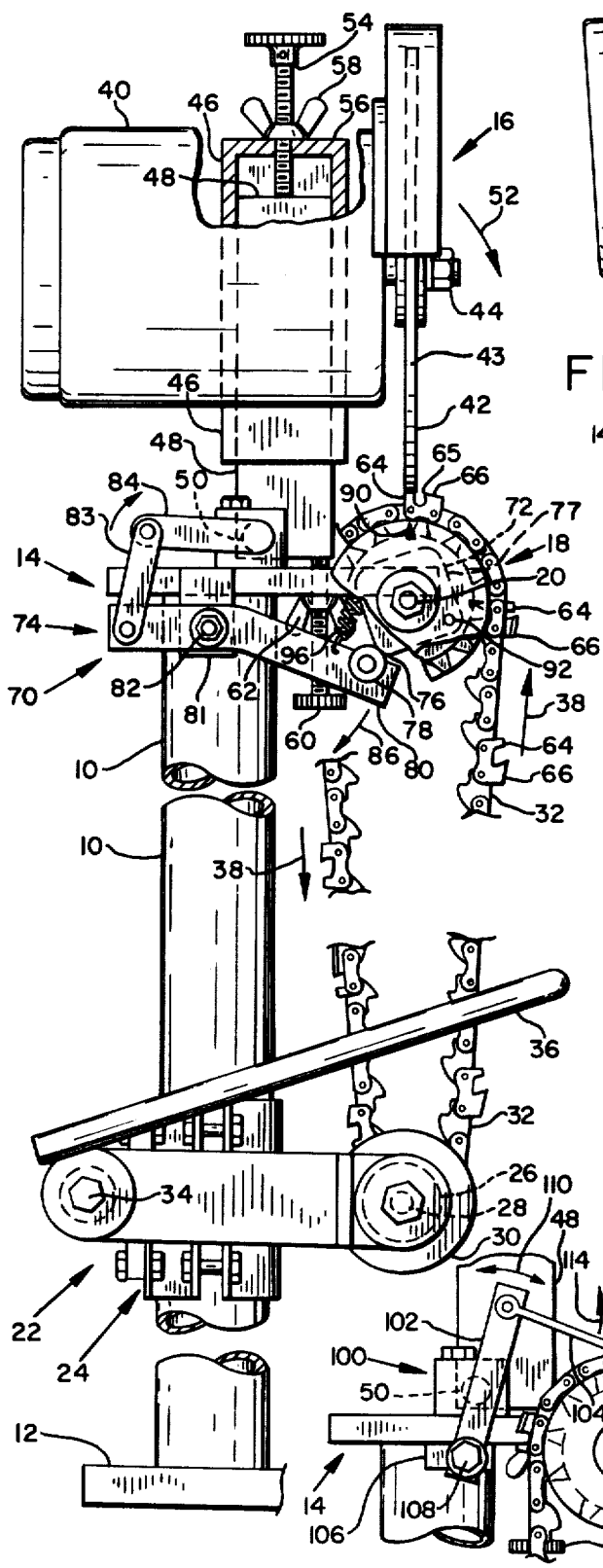
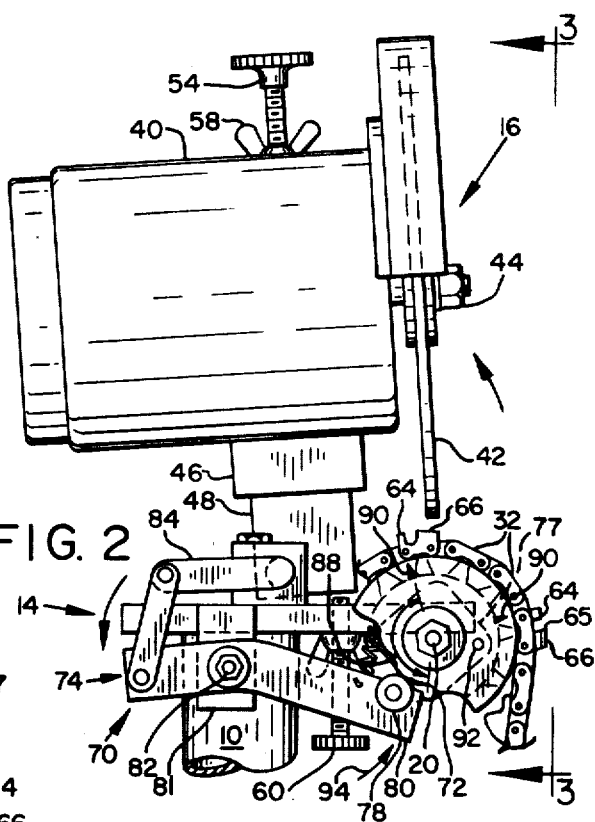
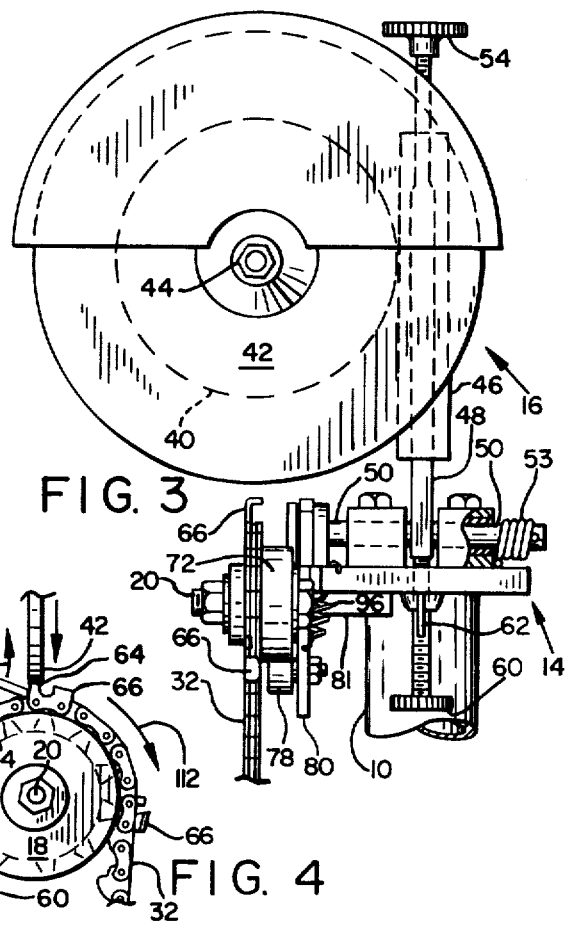
FIG. 1
FIG. 2
FIG. 3
FIG. 4

4,398,437

1

SAW CHAIN DEPTH GAUGE GRINDER

BACKGROUND OF THE INVENTION

The present invention relates to depth gauge grinders for saw chains and more particularly to such a grinder that will grind all of the depth gauges of a saw chain to the same predetermined height.

The cutter links of chipper and chisel saw chains have depth gauges for regulating the depth of cutting by the cutter elements of such links. The depth gauges are ordinarily established at a predetermined height somewhat lower than the leading edges of the cutter elements. During sharpening of the cutter elements, the top cutting edge of each cutter element is lowered slightly because of the downward and rearward slope of the cutter element's top plate. Thus, to reestablish the proper vertical relationship between the top edge of the cutter element and the depth gauge, the top of each depth gauge should also be reground when the saw chain is sharpened.

It is desirable that the depth gauges of different cutter links all be of the same height for smooth cutting action. Thus, it is necessary to be able to lower the depth gauge grinder to precisely the same grinding position during the grinding of the depth gauges of successive cutter links. It is also desirable to be able to precisely and repeatably position successive depth gauges in a grinding position beneath the grinding wheel to grind the tops of the gauges to substantially identical, usually flat, profiles. Finally, it is necessary to avoid inadvertently grinding the cutter elements while repositioning the chain beneath the grinding wheel for grinding successive depth gauges. Prior saw chain grinders meet some but not all of these requirements.

U.S. Pat. No. 2,811,874 to P. Rethoret and my own U.S. Pat. No. 3,779,103 disclose adjustable pawls for holding a saw chain cutter link with its depth gauge in a grinding position beneath the grinding wheel. However, neither of these patents disclose means for preventing the grinding wheel from contacting other cutter elements of the cutter links during repositioning of the saw chain.

My U.S. Pat. No. 3,717,051 discloses a depth gauge grinder in which the grinding wheel is automatically lifted over the cutting element when the saw chain is being repositioned on the saw chain holder to grind the depth gauges of successive cutter links. Such grinder employs a pivotable lever member positioned adjacent the grinding wheel so as to be engaged and lifted by each cutter link passing beneath such member. Lifting of the lever member actuates a connected linkage to lift the grinding wheel away from the saw chain and thus allow the cutter element following the depth gauge to pass beneath the grinding wheel. Damage to the cutter element is thereby avoided. However, reliance on a cutter link itself to actuate the linkage which lifts the grinding wheel away from the cutter link is, at least in some instances, undesirable because of the inherent lateral instability of the saw chain on its holder. Such instability can introduce uncertainties and inconsistencies in the operation of the lifting mechanism, causing it to malfunction by failing to lift the grinder a sufficient distance to clear a cutter link, resulting in inadvertent grinding of and damage to the cutter elements.

Accordingly, there remains a need for an accurate depth gauge grinder which will reliably and preferably automatically prevent inadvertent grinding of cutter elements during chain repositioning to grind successive depth gauges.

SUMMARY OF THE INVENTION

It is therefore one object of the invention to provide an improved saw chain depth gauge grinder.

Another object of the invention is to obtain a fixed longitudinal relationship between the grinder wheel and each depth gauge during grinding which is repeatable from one cutter link to the next.

A further object of the invention is to repeatedly grind the outer ends of depth gauges of successive cutter links to a uniform height with the grinding being accomplished at the same longitudinal position from one depth gauge to another.

Yet another object is to reliably lift the grinding wheel a sufficient distance to clear passing cutter links during movement of successive depth gauges into a grinding position.

An additional object is to securely, yet releasably, hold each depth gauge in the grinding position during grinding.

Another object of the invention as aforementioned is to prevent inadvertent grinding of cutter elements other than the depth gauge during repositioning of the chain for grinding successive depth gauges.

In a saw chain depth gauge grinder according to the invention, these objects are fulfilled by establishing a fixed relationship between the longitudinal position of the saw chain cutter links and the vertical position of the grinding wheel. The grinder has support means for supporting a portion of the length of a saw chain for lengthwise movement through a grinding position, means for positioning successive cutter link depth gauges in grinding position during grinding, means for moving the grinding wheel away from the saw chain to clear a passing cutter element as successive depth gauges are moved longitudinally into a grinding position, and means for adjustably setting the grinding wheel to a preselected position adjacent the support means to successively grind the top of each depth gauge to a uniform preset height.

In one embodiment, the grinder has a rotating camming means which is rotatable with the saw chain support means and which has a camming surface synchronized with the positions of saw chain cutter elements on the saw chain support means. When the support means is rotated, the camming surface operates a linkage which moves the grinding wheel into grinding contact with the depth gauge only when the depth gauge is in grinding position. When a depth gauge moves longitudinally on the support means in either direction away from the grinding position, the camming surface and linkage operate to move the grinding wheel away from the saw chain and maintain clearance unil the next depth gauge is in grinding position.

In a second embodiment, an adjustable pawl is positioned so that its end abuts the cutter link during grinding of the depth gauge while it is in correct grinding position. During repositioning of the saw chain in a backward direction, the pawl rides up on top of the cutter link and other links to shield the links from the grinding wheel until the next depth gauge reaches the grinding position.

Both embodiments of the invention thus maintain a fixed relationship between the depth gauge and the grinding means during grinding to accurately and repeatedly grind successive depth gauges to a uniform height and provide protection means for preventing inadvertent grinding of portions of the cutter link other than the depth gauge.

The foregoing and other objects, features and advantages of the invention will become more apparent from the following detailed description of two preferred embodiments which proceeds with reference to the drawings.

BRIEF DESCRIPTION OF THE DRAWINGS

FIG. 1 is a side elevational view of a first embodiment of an improved saw chain depth gauge grinder according to the invention with portions broken away to more clearly show various features of construction.

FIG. 2 is a side elevational view of the upper portion of the machine of FIG. 1 showing operation of the rotational cam to move the grinder wheel away from the saw chain during repositioning of the cutter links.

FIG. 3 is a partial front elevational view taken along the line 3—3 in FIG. 2.

FIG. 4 is a side elevational view of a central portion of a second embodiment of an improved saw chain depth gauge grinder in accordance with the invention.

DESCRIPTION OF PREFERRED EMBODIMENTS

The general structure of a saw chain depth gauge grinder is described in my prior U.S. Pat. No. 3,717,051, to which reference may be made for details not described herein. The following description emphasizes the features of the present invention.

FIG. 1 EMBODIMENT

Referring to FIG. 1, an improved saw chain depth gauge grinder according to the invention has an upright column or standard 10 mounted upon a base 12. A platform 14 is secured to the upper end of the standard 10. The platform supports a grinding means 16 above a saw chain-supporting sprocket 18. Sprocket 18 is freely rotatable about a horizontal shaft 20.

Spaced below platform 14 is a second platform or support arm 22 connected to standard 10 by a bracket 24. At one end of platform 22 is a pulley 26 mounted on a horizontal shaft 28 of a reversible gear motor 30. The pulley is aligned below the sprocket so that a saw chain 32 can be entrained around them both.

At its opposite end, support arm 22 is connected to bracket 24 by a pivot shaft 34. A lever 36 connected to arm 22 enables the arm and motor 30 carried thereon to be rotated counterclockwise about shaft 34 toward sprocket 18 to release tension on the saw chain 32. The saw chain can thus be installed upon or removed from pulley 26 and sprocket 18. Conventional controls (not shown) enable motor 30 to be operated to drive the chain forward or in reverse, and continuously or intermittently. In this embodiment, motor 30 preferably drives the saw chain counterclockwise, as indicated by arrows 38.

Grinding means 16 includes a high speed electric motor 40 with a depth gauge grinding wheel 42 mounted for rotation on motor shaft 44. Wheel 42 is positioned to rotate in a median plane generally parallel to and passing through the axis of shaft 20 about an axis generally parallel to the median plane of sprocket 18. As shown, the grinding wheel has a flat circumferential grinding surface 43 normal to its plane of rotation for grinding flat-topped depth gauges. However, the position of the wheel and the profile of its grinding surface can be varied to grind different depth gauge configurations, for example, the inclined depth gauges disclosed in U.S. Pat. No. 3,929,049 to Graverson.

The motor 40 is supported on a vertically-extending, elongated, rectangular casing 46 in which a rectangular internal support member 48 is slidably received. Member 48 is pivotally connected at its lower end to platform 14 by a journaled shaft 50. This shaft allows the grinding wheel to be pivoted through an arc parallel to the plane of sprocket 18 to raise and lower the grinding wheel, as indicated by arrow 52. A coil spring 53 (FIG. 3) around shaft 50 has one end engaging the shaft and its other end engaging platform 14 to bias the grinding wheel to a raised position.

A first adjusting screw 54 extends vertically through the enclosed upper end 56 of casing 46 and engages the upper end of support member 48 to adjust the vertical position of the grinding wheel relative to a saw chain on support member 48. Wing nut 58 locks the adjusting screw once it is set. A second adjusting screw 60 extending vertically through platform 14 abuts the lower end of support member 48 at a position spaced horizontally from pivot shaft 50. Screw 60 is adjusted vertically and locked by wing nut 62 to determine the lower limit of travel of the grinding wheel. The adjusting screws thus control the height to which depth gauges 64 of successive cutter links 66 are ground. Screw 54 also provides the adjustment which compensates for grinding wheel wear.

In accordance with the invention, the above-described grinder includes camming means 70. The camming means is operable to maintain a fixed relationship between the vertical position of the grinding wheel and the longitudinal position of the saw chain such that the wheel is lowered only when a depth gauge is in a grinding position precisely below the wheel and is otherwise raised. The camming means includes a rotating camming member 72 coaxially connected to sprocket 18 and a camming linkage 74 connected to shaft 50.

The camming member has an outer circumferential camming surface, including lobes 76 separated by valleys 77, positioned to engage a cam roller 78 on an adjacent end of a rocker arm 80. Arm 80 is pivotally connected between its ends by a pivot pin 82 to a depending ear 81 of platform 14. A link 83 has its lower end pivotally connected to the free end of the rocker arm opposite roller 78. The upper end of link 83 is pivotally connected to one end of a lever 84. The opposite end of lever 84 is fixed at shaft 50. Rotation of sprocket 18 rotates the camming member 72, causing a lobe 76 to engage roller 78 to pivot the roller end of the rocker arm downwardly away from the sprocket, as indicated by arrow 86. The rocker arm, link 83 and lever 84 transmit this motion to shaft 50, thereby rotating the grinding means 16 clockwise on shaft 50, as indicated by arrow 52.

Cam lobes 76 are positioned relative to the teeth of sprocket 18 such that the depth gauges 64 of a saw chain having a known pitch, are in a grinding position precisely beneath the grinding wheel when the apex of lobe 76 engages roller 78, as indicated by arrow 88 in FIG. 2. In the case of the multiple-lobed camming member shown, this relationship must exist for each lobe. A timing mark 90 is provided to indicate the proper position of each depth gauge as the saw chain circulates around the sprocket.

The camming member shown in the drawings has four lobes 76, spaced equidistantly around its circumference. The size and shape of the camming member used corresponds to the size of the sprocket used and the pitch of its teeth. The pitch of such teeth, in turn, is related to the pitch of the saw chain to be sharpened. Thus, saw chains of different sizes (pitch) will require different sprockets and cams. In the illustrated example, the sprocket's circumference is four times the distance between cutter links. Hence, a four-lobed camming member is used.

For convenience, each sprocket can have its own, permanently-attached camming member. However, the sprocket may also be separable from the camming member so as to be independently interchangeable on the sprocket shaft 20. In the latter case, as shown, a removable pin 92 extends through the sprocket and camming member to secure them together in their proper angular relationship.

Several variations of the FIG. 1 embodiment are possible. For example, motor 30 could be a manually rotatable mechanism such as a crank. As another example, a spring 96 can be extended between the cam roller end of rocker arm 80 and platform 14 to substitute for or supplement spring 53. Alternatively, the biasing direction of spring 53 can be reversed and spring 96 used to counteract spring 53, the relative tensions on the springs being proportioned to bias the grinding means to a slightly raised position. As a further alternative, the weight of the grinding means and the tension of spring 53 can be counterbalanced against one another to place the grinding means in such slightly raised position. In another variation, the camming member could employ an internal rotating camming surface. In this variation, spring 53 would be reversed to bias the grinding means to a lowered position. Rotation of the internal camming surface would allow the spring and gravity to lower the grinding wheel, and the internal camming lobes would raise the wheel against the tension of the spring. In yet another variation, the camming linkage can be rearranged so that the cam lobes 76 raise, rather than lower, the grinding means. In this variation, ear 81 and pivot pin 82 are positioned at the end of arm 80 opposite roller 78. Link 83 is pivotally connected between the ends of the rocker arm.

OPERATION—FIG. 1 EMBODIMENT

The FIG. 1 embodiment is prepared to grind the depth gauges of a selected saw chain 32 as follows. The first step is to select, and, with grinding means 16 raised, mount a sprocket 18 and camming member 72 on shaft 20. The size of the sprocket is selected so that its teeth engage and mesh with the drive links of the saw chain to be ground. The proper camming member for the sprocket is either affixed to the sprocket or separately selected to correspond to the sprocket to be used.

Next, the saw chain is entrained around the sprocket and pulley 26, using operating lever 36 to raise and lower the pulley. The chain is oriented to be rotated in its normal cutting direction by motor 30, that is, counterclockwise. The depth gauges 64 are synchronized with timing marks 90 on the sprocket.

Next, adjustment screw 60 is adjusted so that it does not interfere with operation of the camming means. That is, cam lobes 76 should determine the lower limit of travel of grinding wheel 42. Adjustment screw 54 is advanced with a low point of the camming surface engaging roller 78 so that the grinding wheel easily clears the cutter teeth. Then the sprocket is manually rotated to center a cam lobe 76 under roller 78. Screw 60 is then advanced until it lightly contacts the bottom member 48 to serve as a back-up stop, and wing nut 62 is locked against platform 14. It should be noted that screw 60 can be omitted in any embodiment in which the camming means is arranged to positively lower the grinding means. However, if the camming means is arranged to positively raise the grinding means, screw 60 should be used to set the lower limit of travel of the grinding wheel.

Then, with motor 40 turned on and motor 30 off, screw 54 is backed away from casing 46 to gradually lower motor 40 until grinding wheel 42 contacts depth gauge 64. Screw 54 is turned further until the top of depth gauge 64 is ground to the desired depth to provide adequate clearance below the previously sharpened cutting edge 65. Wing nut 58 is then locked against the top wall 56 of casing 46 to determine the depth of grind. The apparatus is now ready to operate.

With grinder motor 40 on, gear motor 30 is turned on, causing the chain to slowly advance in the direction of arrow 38. Movement of the chain rotates the sprocket and, in turn, the camming member. As portions of the chain, other than the depth gauge, pass through the grinding position, cam roller 78 engages one of the valleys 77 between two lobes 76, and the grinding wheel is held in a raised position by spring 53 and 96.

As each depth gauge approaches the grinding position beneath wheel 42, a cam lobe 76 engages cam roller 78, actuating linkage 74 to lower the grinding wheel to its grinding position. The grinding wheel reaches its maximum descent when a depth gauge is precisely aligned beneath it. At this point, the wheel contacts the depth gauge and briefly grinds an amount of material therefrom as determined by the setting of screw 54.

As soon as the depth gauge passes this centered position, the elevation of the cam surface abruptly declines, allowing the cam roller to move inwardly toward shaft 20, as indicated by arrow 94 in FIG. 2 under the influence of springs 53 and 96. This movement is transmitted through linkage 74 to allow the grinding wheel to be raised by springs 53 and 96 so that the wheel ceases grinding.

The elevation of the cam surface continues to decline as the chain and sprocket rotate, allowing springs 53 and 96 to lift the grinding wheel a sufficient distance to clear the cutter element and following chain links so that they are not ground as they pass through the grinding position. As the next depth gauge approaches, the grinding wheel is again lowered by the cam lobe and the foregoing process is repeated.

Each successive depth gauge can thus be automatically ground to a uniform preset height. Any movement of the depth gauge away from the grinding position is transmitted through the cam to lift the grinding wheel and cease grinding. Depth gauges ground to a uniform height are thus produced. Finally, any risk of inadvertently grinding parts of the saw chain other than the depth gauges is avoided.

When wheel 42 wears down, lock nut 58 is loosened and screw 54 threaded out to lower the grinding means to the desired height. Then nut 58 is retightened.

FIG. 4 EMBODIMENT

Much of the structure of the grinder of FIG. 4 is like that of the FIG. 1 embodiment. However, there are several differences. A manual chain rotating mechanism, such as a crank (not shown), is preferably substituted for motor 30. A second pulley (not shown) can also be substituted for sprocket 18.

In lieu of a camming means 70, an adjustable stop means 100 is used to locate the depth gauges in the aforementioned grinding position. The stop means includes a flat bar member 102 pivotally supporting a pawl 104.

Member 102 has its lower end connected to an ear 106 depending from platform 14 by bolt 108. The bolt provides a position adjustment for the pawl to determine the correct grinding position for the depth gauge 64 of a cutter link 66. Bolt 108 parallels and is at approximately the same elevation as sprocket shaft 20. Member 102 extends generally upwardly from bolt 108, is parallel to the plane of rotation of the sprocket and is slightly offset from such plane toward platform 14.

Pawl 104 is pivotably connected at one end to the upper end of the bar member at a position above the upper periphery of sprocket 18. The pawl is inclined downwardly toward the sprocket and mounted saw chain so as to press the saw chain against the sprocket at approximately the grinding position. Consequently, the pawl stabilizes the saw chain and particularly the cutter links for grinding. The pawl has its distal end positioned adjacent the grinding position to abut the front end of the cutter link when the chain is rotated toward the pawl. Bolt 108 can be loosened slightly to pivot the bar member 102 toward or away from the sprocket. The position of the pawl's distal end can thus be adjusted to determine the grinding position for a depth gauge.

OPERATION—FIG. 4 EMBODIMENT

Adjustment screws 54 and 60 are first preset to establish the lower limit of descent of the grinding wheel. A saw chain is then entrained around the sprocket and pulley. With the grinding wheel raised, the saw chain is manually advanced until a depth gauge is in the grinding position desired. Bolt 108 is loosened and member 102 is pivoted as indicated by arrow 110 until the distal end of the pawl firmly engages the front of the cutter link. Bolt 108 is then retightened.

To grind the first depth gauge, motor 40 is started. The grinding means is then lowered. The grinder grinds the gauge down until the bottom of support member 48 abuts adjustment screw 60.

To grind the next link, the chain is rotated clockwise as indicated by arrow 112. As the next cutter link approaches the grinding position, it lifts the pawl into the path of the grinding wheel, as indicated by arrow 114. Ordinarily, the grinder operator or spring 53 will raise the grinding wheel. However, if the wheel is not raised soon enough, the distal end of the pawl, lifted by the rear of a cutter link, engages the grinding wheel, protecting the cutter link from damage. As soon as the depth gauge passes beneath the pawl, the pawl's distal end drops. Movement of the chain is then reversed until the front of the cutter link firmly abuts the pawl. At this point, the depth gauge is in correct position for grinding, and the grinding wheel is lowered to grind. Grinding continues until member 48 engages screw stop 60. The foregoing steps are repeated to grind successive depth gauges to a uniform preset depth.

The pawl resists longitudinal movement of the saw chain during grinding. Also, because the pawl engages the cutter link at a downward inclination, it presses the cutter element firmly against the sprocket or pulley. This action stabilizes the cutter link both vertically and laterally on the support means to provide an accurate grind. The tops of successive depth gauges can thus be repeatedly ground to a uniform height. Portions of the saw chain other than the depth gauges are fully protected from inadvertent grinding.

Having described two preferred embodiments of my invention and their operation, it should be readily apparent that such embodiments can be modified in arrangement, detail and application without departing from the spirit of my invention. I claim all such modifications and variations as come within the scope of the following claims.

I claim:

1. A saw chain grinder comprising:
   support means including a saw chain sprocket for rotatably supporting a length of saw chain for lengthwise movement to enable movement of successive depth gauges of said chain through a grinding position;
   grinding means for grinding the outer ends of said depth gauges while supported in said grinding position;
   positioning means for positioning said grinding means in a first predetermined position spaced from said support means for grinding said depth gauges to a uniform height, said grinding means being movable to a second position spaced from the saw chain;
   a camming means including a rotational cam rotably connected to the saw chain sprocket in a fixed angular relationship synchronized with the depth gauges of said saw chain; and
   linkage means interconnecting the camming means and the grinding means;
   the camming means being operative, when a depth gauge is in said grinding position, to move said grinding means between said first position and said second position upon movement of the depth gauge longitudinally away from the grinding position.

2. Apparatus according to claim 1 in which the rotational cam includes multiple camming lobes spaced angularly apart for moving the grinding means between said first and second positions as each successive depth gauge is moved through said grinding position.

3. Apparatus according to claim 1 in which the rotational cam is rotationally synchronized with the saw chain so as to move the grinding means to said first position when each depth gauge is moved to said grinding position.

4. Apparatus according to claim 1 including biasing means for yieldably biasing the grinding means to said second position, the camming means being operable to move the grinding means to the first position as a depth gauge is moved into grinding position.

5. Apparatus according to claim 1 in which the camming means is responsive to movement of said depth gauge in both directions lengthwise of the saw chain from said grinding position to move the grinding means away from said first position.

6. Apparatus according to claim 1 in which the camming means is mounted alongside the support means and movable therewith to actuate the linkage means.

7. Apparatus according to claim 1 in which the camming means is separably connected to the support means so as to be interchangeable for use with different saw chains.

* * * * *